July 13, 1965  E. R. McKEAG  3,194,157
METHOD OF PRINTING WORKPIECES
Filed Dec. 19, 1962  5 Sheets-Sheet 1
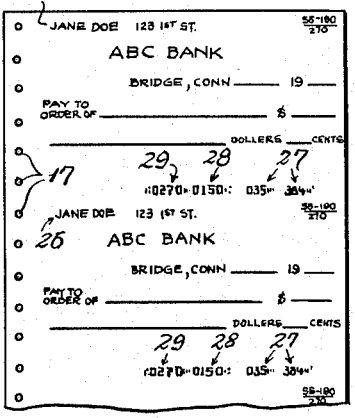
Fig. 1
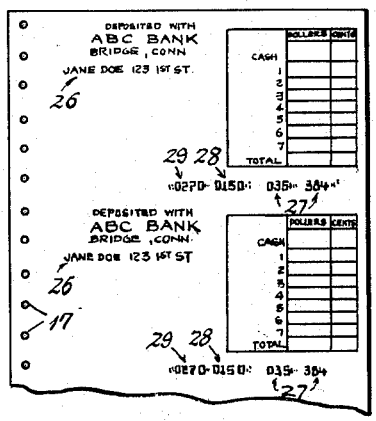
Fig. 2
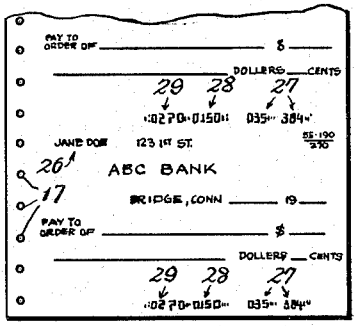
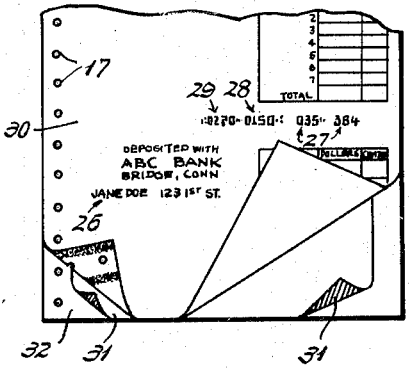
INVENTOR.
Earnest R. McKeag
BY
Johnson and Kline
ATTORNEYS July 13, 1965  E. R. McKEAG  3,194,157
METHOD OF PRINTING WORKPIECES
Filed Dec. 19, 1962  5 Sheets-Sheet 2
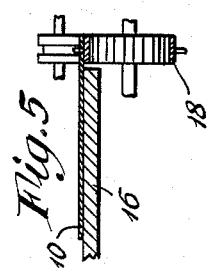
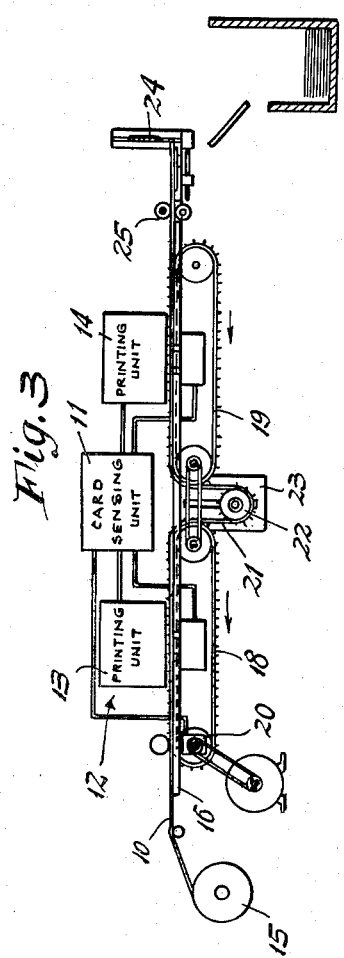
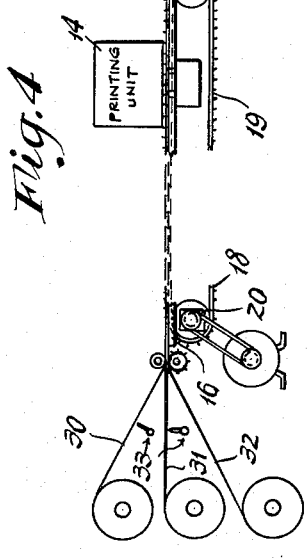
INVENTOR.
Earnest R. McKeag
BY
Johnson and Kline
ATTORNEYS

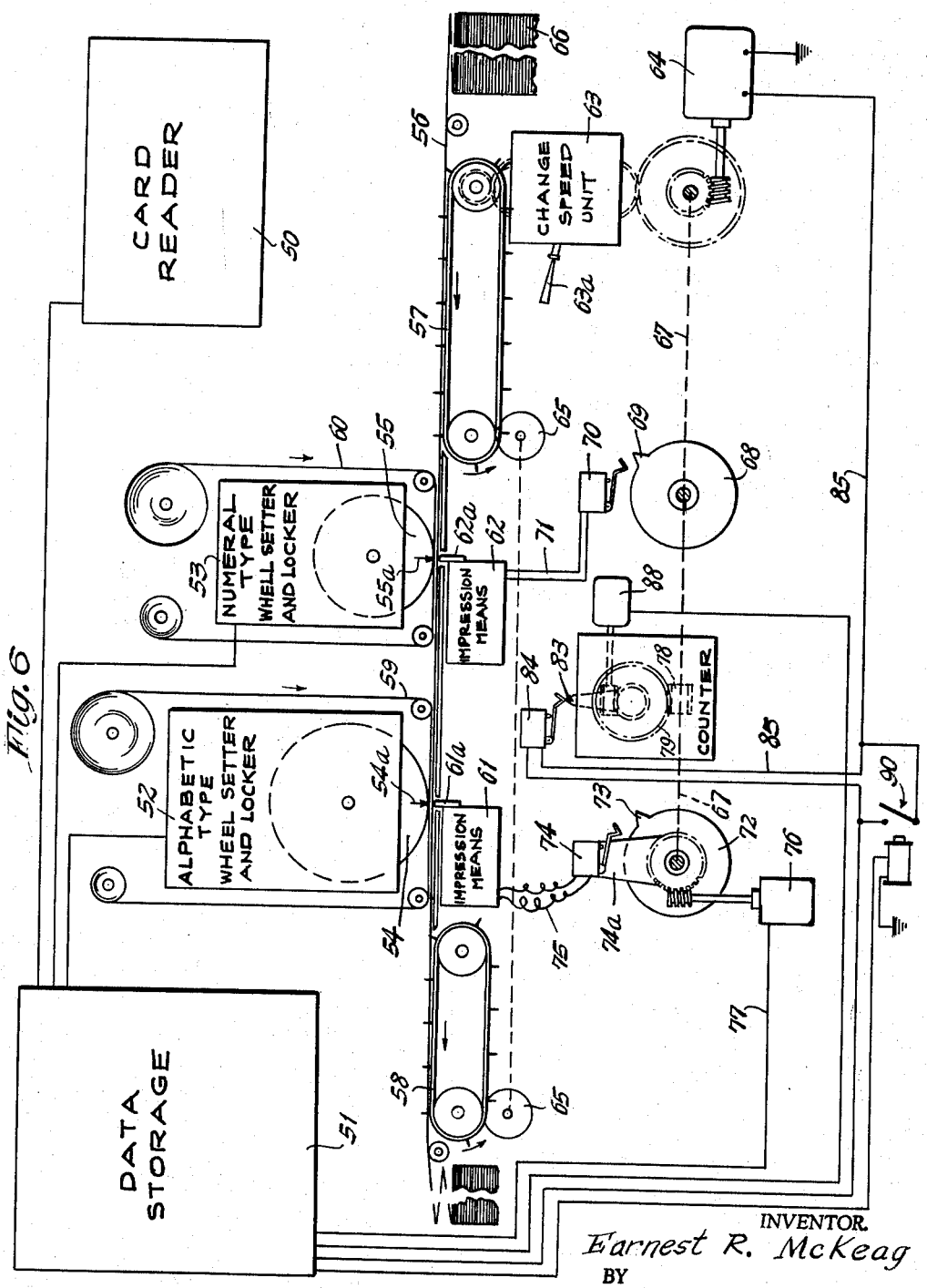

July 13, 1965  E. R. McKEAG  3,194,157
METHOD OF PRINTING WORKPIECES
Filed Dec. 19, 1962  5 Sheets-Sheet 4
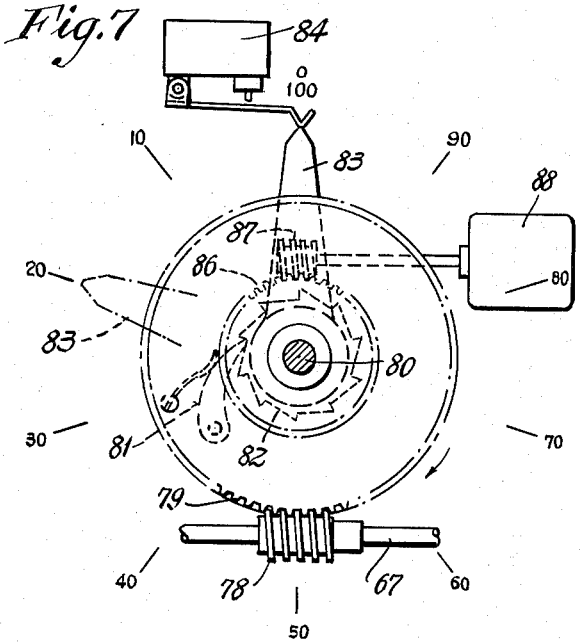
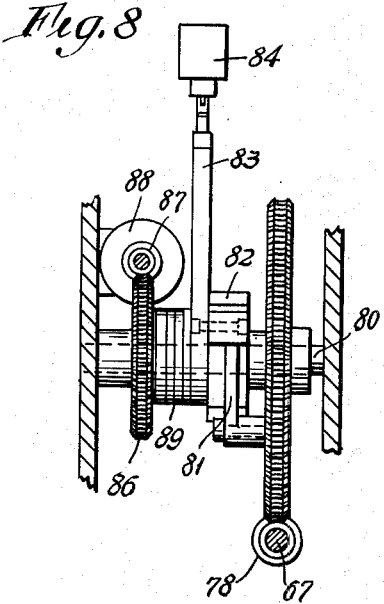
INVENTOR.
Earnest R. McKeag
BY
Johnson and Kline
ATTORNEYS July 13, 1965  E. R. McKEAG  3,194,157
METHOD OF PRINTING WORKPIECES
Filed Dec. 19, 1962  5 Sheets-Sheet 5
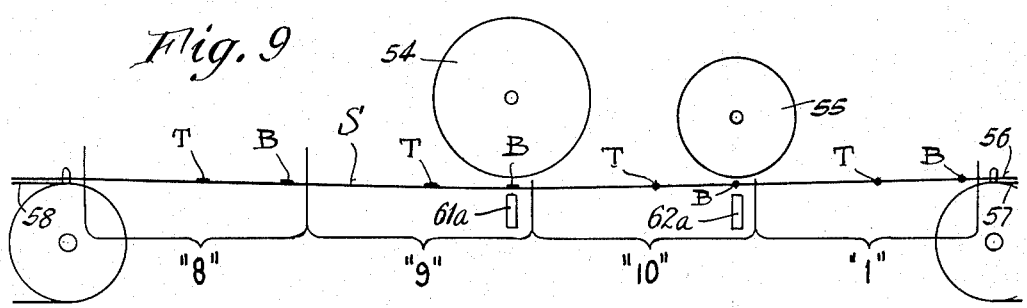
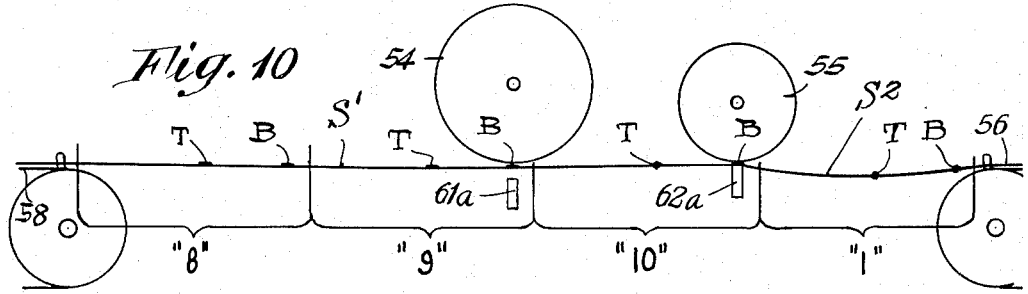
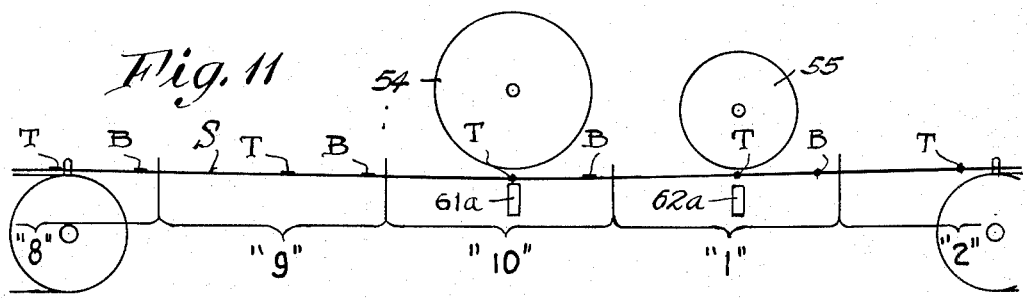
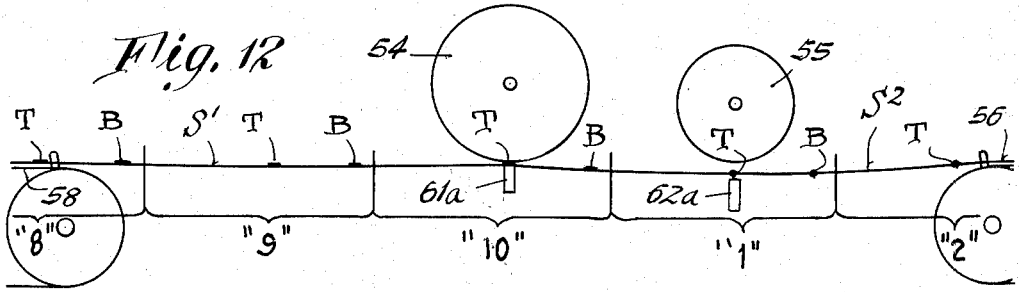
INVENTOR.
Earnest R. McKeag
BY
Johnson and Kline
ATTORNEYS

United States Patent Office 3,194,157
Patented July 13, 1965

3,194,157
METHOD OF PRINTING WORKPIECES
Earnest R. McKeag, Ridgewood, N.J., assignor to Autographic Business Forms, Inc., Hackensack, N.J., a corporation of New Jersey
Filed Dec. 19, 1962, Ser. No. 245,825
6 Claims. (Cl. 101—426)

This invention relates to an improved method of printing checks, deposit slips, and other business and like documents.

This application is a continuation-in-part of my copending application Serial No. 125,029, filed July 3, 1961, which is a continuation-in-part of my application Serial No. 21,313, filed April 11, 1960.

At the present time, it is customary to base print a supply of checks and like documents with the name of a bank and other indicia which is common to all checks in use by such bank, and later to print limited quantities of such items with indicia such as the name, address, and the account number of an individual bank customer. The has been done conventionally by locking up in a press chase rigid type or printing plates made therefrom relating to the individual bank customer, then printing the number of checks required, for example 100 units, and then removing the type or printing plates from the chase of the printing press and inserting newly prepared type or plate material required by and related to the next bank customer. It is not practical, however, by this conventional printing and preparatory method, to produce personalized and account numbered checks or deposit slips in quantities less than 100 units because of the cost of the preparatory work and the press make-ready in relation to the quantity of documents produced therefrom and for the reason that the manufacturer must set the selling price of the product and service so produced higher than the purchaser will pay. However, there exists a great demand for such small quantities of personalized and account numbered bank documents. Up to the present time, this demand cannot be satisfied.

An object of this invention is to provide an economically practical method of personalizing and account numbering of any quantity of checks or deposit slips in multiples of ten units, for instance, with the minimum quantity to be ten units.

It is a further object of this invention to eliminate the need for all conventional preparatory work common to conventional printing methodology such as typesetting, proofing, platemaking, and press make-ready. As will be seen in the disclosure to follow, this objective has been met without the usual wastage of type and/or printing plate material common to conventional printing methodology resulting from the necessity of changing from one press make-ready to another upon completion of the small quantity of personalized and account numbered batch run and without the necessity for preliminary typesetting, proofing and platemaking.

Another object of this invention in making the methods of this invention possible and practical is to avoid the necessity for interrupting the printing process for the purpose of making the type change required upon completion of one small batch quantity run to the start of the next.

A yet still further object of this invention is to provide a practical mechanically and electronically controlled mechanism whereby wheels bearing on their periphery the alphabetic and numeric characters are automatically set up according to predetermined instructions to electronic storage and memory units forming an integral component part of the equipment represented by the invention, in less than ten seconds of time and once so set according to these predetermined instructions, such as bank customer name and assigned account number, such type is locked in all respects in accurate alignment and positioned for the highly precise printing requirements of the type of printing to be referred hereinafter to as Magnetic Ink Character Recognition.

In order to reduce the effort and time required in banks, means have been devised and are now in use whereby indicia on checks, deposit slips, etc. may be optically, magnetically, or electrically sensed for the purpose of sorting, routing, and identification with the customer as by bank number, branch number, or account number, respectively.

For this purpose, certain areas are designed to receive the respective indicia and certain standardized characters known as Magnetic Ink Recognition Characters, numeric in format, are used, and these, having been imprinted with magnetic ink, may be sensed by automatic equipment and be translated thereby into various kinds of actions or responses in machinery such as sorting, computing, and/or high speed data processing machines. However, such indicia, for the purpose required by the banks, must be unique to each bank customer separately and different from required indicia for each other bank customer.

What has been said about bank checks applies also to deposit slips and other documents which must be identified with one customer and one customer only. In the majority of cases, each bank customer requires only small quantities of documents such as deposit slips for use over a period of many months. To obtain such small batch quantities, each different from all others, is a problem solved by this invention. Here again, the deposit slips and other pieces are preprinted in large quantities in general or standard form with some indicia applicable to all individuals and banks or bank branches, etc., and the indicia unique to and identifying each customer is afterprinted on a limited number of pieces by the methods and with the apparatus of this invention in the same manner as with checks.

Another object of this invention is to provide a simple and expedient method of printing and after-printing such pieces with such individual and/or general indicia without the necessity of feeding such workpieces one by one to a printing press.

To do this according to the present invention, the checks or other pieces are printed in continuous form with the standard indicia, and while still in such form are afterprinted seriatim by one or more printing units. The printing units may be provided with the usual font of characters or with special characters and the printing may be performed with ordinary and/or special ink or transfer material according to the requirements. Theerafter, the continuous strips are severed into separate checks or pieces and are stacked and bound for distribution and use. The after-printing is preferably performed by settable wheels carrying on their peripheries letter and/or number and/or symbol type faces.

According to the present invention, the after-printing for each kind of workpiece is controlled by a prepared card such as a tabulating card having punch holes so positioned that when presented to an interpreting or sensing mechanism they will control the setting of the printing wheels in one or more printing units and determine the number of checks or pieces to be after-printed. The cards for the various kinds of workpieces are stacked so that after the wheel setting is performed according to one card the next card is presented to the scanning mechanism.

In one form of my invention, the continuous strip is accurately and positively advanced intermittently to the printing unit or units by a longitudinal row of feed perforations usually in one margin of the strip engaging suitable pin bearing devices such as a wheel or belt. The feeding operations of the strip may be controlled coordinately with the operations of printing units so that the strip of workpieces is stationary while the after-printing is being done.

Thus it is merely necessary, according to this invention, for the printer to have on hand a supply of preprinted checks or pieces with indicia general to all accounts and a punched card for each account and use the latter when filling an order for personalized checks or a reorder thereof at any time.

According to the present invention, the position of the lines of after-printing on the checks may be controlled by adjusting the printing unit or units longitudinally along the path of travel of the strip, or by forming a loop in the web between adjacent printing units. Thus the imprints may be located in any desired position of a check for instance, from the uppermost transverse margin to the lowermost.

The printing units may include a printing wheel for each letter-space across the check and therefore the after-printing may be done on any place on the check from one edge to the other.

In many cases only a single ply preprint strip is after-printed. However, in the other cases, particularly deposit slips, it is desired to have several copies of each transaction and, therefore, the strip will be multi-ply.

In another form of my invention disclosed herein, the punch cards representing the data applicable to individual accounts are stacked in a card reader. When the first card is read, the data therefrom is stored in a data storage unit and, when the storing is completed, the printing wheels are set according to the data stored for that particular card. When this is completed, the feed mechanism for the continuous printed strip is started to advance the strip, the starting position of the strip having been predetermined manually. When the strip has advanced a predetermined distance, the printing mechanism for that line is operated and one line of printing is produced on the strip without stopping the strip. As the strip continues to move and the place on the strip to receive the second line of printing reaches the printing line of the second group of type wheels, the second line is printed while the strip is still moving, and these printing operations are repeated as check after check on the continuous strip passes under the printing wheels until the desired number of checks with that particular indicia has been printed. The number of checks printed having been counted on a descending counting device which was set to a predetermined position by the data storage unit according to data on the first card, when the descending counter reaches zero, the printing operation stops.

In the meantime, the second account card has been read and the data has been stored in the storage unit, ready to be transferred to the printing wheels and descending counter. Immediately after the printing wheels have been reset and the descending counter set to the number of checks to be imprinted, the feed mechanism is again started and the advancement of the preprinted strip and printing operations, as determined by the second account card, again resumes until the descending counter reaches zero position and a predetermined number of checks with the indicia for the second account has been printed. These operations continue as long as cards are presented to the card reader and data is stored in the data storage unit.

This second form of my invention is advantageous and usually preferable because with it a great deal of time is saved in the printing operations, since the advancement of the strip of checks does not have to be interrupted for the printing operations. Another advantage of this second form is that by controlling the point in the cycle of operations at which the printing is performed, the positions of the lines of printing on the check may be varied relative to each other and relative to the check itself, thus adapting the machine to different styles of check format. A further advantage is that by changing the linear speed at which the printed strip of checks passes through the printing units, checks or other documents having different dimensions from leading to trailing edge may be handled in the same machine and the printed lines may be caused to fall where desired.

Another feature of my invention is the providing for the substantial increase in speed at which the successive checks, etc. may be printed without interrupting the feeding of the continuous strip as a whole. This, as will be more fully explained below, involves the step of providing a relatively small amount of slack in the strips between the input feed device and the delivery feed device whereby when the type faces and impression devices are in engagement with the strip and the transfer means, movement of the strip or strips is prevented by such engagement during the interval of a few milliseconds that the engagement exists. In this way, blurring of the images on the checks, etc. which would occur at such high speeds of strip travel and which would be detrimental to proper recognition of the magnetic ink characters is avoided without the loss of time which would be incurred if the strip as a whole were intermittently advanced.

Other features and advantages will hereinafter appear.

In the accompanying drawings—

FIGURE 1 shows a continuous strip of workpieces printed according to the present invention and before the workpieces have been severed from the continuous strip.

FIG. 2 is a view like FIG. 1 but shows superposed continuous strips to provide a plurality of sets of assembled workpieces.

FIG. 3 is a schematic view of apparatus that may be employed for printing strips of checks or the like, such as the strip shown in FIG. 1 according to one form of the present invention.

FIG. 4 is a fragmentary view showing apparatus which may be used for printing and assembling the strips shown in FIG. 2—only the introductory and delivery ends of the apparatus being shown, the intermediate portions being the same as in FIG. 3.

FIG. 5 is a detail sectional view showing the belt for feeding the continuous strip and the driving means therefor.

FIG. 6 is a schematic view showing another form of apparatus which may be employed for printing continuous trips of checks and the like according to the present invention.

FIG. 7 is a front elevation of a descending counter and switch which may be used with the form of the invention shown in FIG. 6.

FIG. 8 is a side view of the descending counter and switch shown in FIG. 7.

FIGS. 9 to 12 inclusive are similar diagrams showing schematically the method of feeding and printing the series of checks and the slack provided in the stretch of the strip of checks between the introductory tractor and the delivery tractor.

The method of this invention as it applies to printing bank checks will first be described.

The first step is to print by conventional means a large supply of continuous strips, such as the strip 10 shown in FIG. 1 which contains a succession of printed checks having indicia which is common to the individual checks of many kinds, for instance the name of the bank and other indicia such as shown. The continuous strips of checks are stored until needed.

The second step is to prepare a printing control card, such as a tabulating card, having punch holes indicative of specific indicia relating to a particular customer or account and indicative of the number of checks to be printed successively for that customer or account.

A similar control card is prepared for each customer or account and these are stacked in a card-sensing unit indicated by the reference number 11 in FIG. 3. The continuous preprinted strip 10 is then fed into an auxiliary printing machine 12 having a plurality of printing units, one for each line to be printed.

FIG. 3 is a schematic view in which there are shown two printing units 13 and 14 to which the preprinted strip 10 may be fed to receive the after-printing as controlled by the punched cards. The end of the strip 10 may be taken from a supply roll 15 and may be guided through the printing machine 12 by a paper table 16. Preferably the feeding of the strip is controlled by marginally punched holes 17 therein which engage pin-carrying feeding bands 18 and 19. The strip 10 is advanced step-by-step at check-length intervals by intermittently operated feeding means 20 and is initially placed on the feeding band 18 so that the line of the check to be imprinted will register with the printing elements of the printing unit 13 when the strip comes to rest. It is preferable that both printing units 13 and 14 operate simultaneously, and in order that the line of print from the unit 14 may fall on the desired printing line of the check, the apparatus is arranged so that the relative position between the check to be printed and the printing unit 14 can be varied.

This may be accomplished as shown in FIG. 3 by providing a loop 21 in the strip between the printing units 13 and 14 and regulating the length of the loop so that the position of the check to be printed by the unit 14 can be advanced or retracted when threading the web through the printing machine to cause the line of print and the printing line to coincide. The extent of the loop may be controlled by a pin wheel 22 adjustably carried in a slotted bearing plate 23.

The printing units 13 and 14 are preferably of the type comprising a row of wheels bearing type faces on their peripheries and suitable mechanism to position the type wheels under the control of a punched card so that at each operation of the printing units 13 and 14 a single line of type impressions is made by each of the printing units. When the type wheels are positioned, impact devices function to cause ink carried by the type faces or transfer material carried by an interposed ribbon to print the lines on the check. After the first and second lines, in the example given, have been printed on the check, the feed mechanism may advance the strip of checks one check-length and bring the next checks into position to be printed.

According to the present invention, the next step in the method is to separate the continuous strip into individual checks which may be stacked as shown in FIG. 3 where checks of the same kind may be collected in groups and bound together or otherwise disposed of. This may be accomplished by providing a cutter 24 which may be adjusted to register with the line (delineated or not) between adjacent checks.

The marginal edge of the strip having the feed holes 17 may be removed before the strip is cut into check lengths by known cutter mechanism 25 or it may be allowed to remain on the checks and be used for binding the checks into book form.

As indicated above, the number of checks to be printed is also controlled by the punched cards, and this may be accomplished by having the punching on the card control a descending totalizer for each printing unit operated by the impressions made by its printing unit so that if twenty checks of the same kind are required, the descending totalizer will be set for twenty and when it reaches zero it will temporarily interrupt the operation of the printing unit.

The data interpreting machine 11 within which the punched cards are placed is set up so that after the printing wheels have been set on the units, the setting remains locked. When the desired number of impressions has been made by the first printing unit 13, the next card can be positioned to be sensed to set the descending totalizer and to set the type wheels for the first printing unit 13 for the next group of checks to be after-printed. When the desired number of impressions has been made by unit 14 the type wheels for the unit 14 are reset for the next group of checks.

Thus, by successively setting the printing units, no loss of checks will be incurred by the change-over from one kind of check to another.

According to the present invention, one of the printing units 13 or 14 has on its type wheels printing characters which are specially formed for "magnetic ink character recognition" and the other unit may have type faces or ordinary characters. Thus, in the examples shown in FIG. 1, the name and address of the bank customer may be printed as at 26 in ordinary type with ordinary ink or ink ribbon, while the branch and account number indicated at 27, ABA BANK number indicated at 28 and the routing for bank clearance purposes indicated at 29 will be printed with magnetic material so that those items can be sensed on a "magnetic ink character recognition" machine. It is a matter of choice and convenience whether the magnetic characters are printed by the unit 13 or by the unit 14.

It should be understood, of course, that while, in describing the method of this invention, bank checks are referred to, the method may be used for other purposes where a preprinted form is to have after-printing made thereon in limited quantities, and in this connection one such different use is that of preparing bank deposit slips in limited quantities. The method as it applies to such use will now be described in connection with FIGS. 2 and 4 of the drawings.

In this embodiment of the invention, the workpiece includes an original copy strip 30, a transfer strip 31 and a copy strip 32, and if additional copies are required, extra transfer and copy strips may be provided. As shown, these are prepared in continuous form and contain indicia which is common to the individual deposit slips of many kinds, for instance the name of the bank and other indicia such as shown.

The continuous strips are preferably in separate packages such as rolls or zigzag packs, and when needed the strips are guided to the auxiliary printing machine 12 where the record and copy sheet is aligned by pin wheels and the transfer strips are adhesively secured together by mechanism 33 at the margin to make joined sets of strips. The continuous strips are fed over the paper table 16 and their feeding movements are controlled by marginally punched holes 17 in the strips which engage pin-carrying feeding bands 18 and 19 as in the form of the invention shown in FIG. 3. The feeding and imprinting operations are performed in the same manner as referred to in connection with FIG. 3, the printing units 13 and 14 successively operating on the pile of strips, the original strip being printed by ink applied to the printing wheels or through a transfer member and the copy strip having the same indicia printed on it through the medium of the interposed transfer strip.

The other steps of the method are the same as described above in connection with FIG. 3, but the end product in this situation is a plurality of groups of deposit slip booklets all of the same kind and identified with a particular customer or a particular account, each top sheet of the booklet having the preprinting, one line of after-printing in ordinary type, and the other line of after-printing with "magnetic ink character recognition" type.

In practicing the method of this invention above described, the sensing device and printing units and controls may be of the type used in Model 557 manufactured and sold by International Business Machies Corporation.

The method involved in the other form of the present invention may be carried out by apparatus disclosed in FIG. 6.

In this form of the invention, the punch card containing data particular to a customer or a customer's account is read by a card reader 50 and stored in a data storage unit 51. At the proper time the data for a particular card is transferred to an alphabetical type wheel setter 52 and a numeral type wheel setter 53 which positions type wheels 54 and 55 respectively so that the characters to be printed are brought into printing position in lines. A continuous strip 56 of checks is fed by pin-bearing tractors 57 and 58 located respectively at opposite ends of the machine to engage marginal feed holes in the strip, such as the feed holes 17 shown in FIGS. 1 and 2, and thus positively control the feeding and stopping of the preprinted strip. Between the strip 56 and the type wheels 54 and 55 there are located suitable inking means such as ribbons 59 and 60 and these may be advanced in known ways to present fresh surfaces to the printing lines 54a and 55a represented by the arrows in FIG. 6.

Impact for causing the characters to be printed on the strip 56 is provided by impression means 61 and 62 which include hammers 61a and 62a located under the printing lines 54a and 55a respectively which, through known mechanism, may be caused to strike the underside of the paper at the printing lines and cause the transfer of ink or the like from the ribbons to the paper.

The hammers 61a and 62a are moved toward and return from the strip 56 with such speed that it is not necessary to cause the strip 56 to come to rest or even to change its rate of travel during the printing operation. Thus, according to the present invention now being described, the loss of time which would be incurred if it were necessary to stop and start the paper for each printing operation is avoided. Further, by properly controlling the points in the cycle at which the impression means 61 and 62 are respectively operated, the relatively positions of the two lines of printing on a workpiece (a check for instance) can be optionally selected and the lines of printing may be closer together than would be otherwise possible because of the spacing of the type wheels made necessary by their size.

Suitable means for carrying out the method of this invention are shown in FIG. 6, in which the tractor 57 is driven through suitable power transmitting means 63 by an electric motor 64 so that the paper strip 56 will have a determinate linear speed. The tractor 57 may be coupled to the tractor 58 by gearing 65 to operate in unison, thereby avoiding any slack condition of the strip 56 as it passes under the type wheels.

Preferably, the continuous strip 56 of preprinted checks is supplied to the machine in a zigzag folded stack 66 placed at the introductory side of the machine. In introducing the strip 56 from a stack to the apparatus, the strip is placed on the pins of the tractor feed 57 with the blank lines of the strip to be imprinted in predetermined positions relative to the tractor feed, as will be more fully explained below. When the apparatus is to be started, the data storage unit causes the wheels 54 and 55 to be set and locked in alignment, and when this has been done the motor 64 is started and shortly thereafter the impression means 62 is operated to print the lower line (numeral line) on the check. When the strip 56 has traveled a predetermined distance, the upper line (alphabetical line) is brought to the printing line 54a and the impression means 61 is actuated, thus completing the imprinting of that particular check.

As the strip 56 continues to travel without interruption, the operations are repeated until the required of checks has been printed, at which time the feeding of the strip 56 is stopped and the data storage means become operative to reset the numeral type wheel 55 and the alphabetical type wheel 54 in accordance with the data read from the second punch card. In this situation, the lower line on the next check has not quite reached the numeral wheels 55 and the upper line of printing on the first check has just passed the printing point 54a.

According to the embodiment of the present invention now being described, the imprinting operations may advantageously be controlled by the same means which controls the advancing of the strip 56. This is accomplished as shown by providing control means operated by the motor 64, which, it will be remembered, drives the tractors 57 and 58. As diagrammatically shown in FIG. 6, the control means comprises a shaft 67 driven by the motor 64 which makes one revolution for each workpiece (check) imprinted. Switch operating means including a disk 68 having a lobe 69 is secured to the shaft 67. The lobe 69 which engages a switch 70 connected by a circuit 71 to the impression device 62 causes the latter to operate and thus, if the leading edge of the strip 56 has been placed in the proper position on the tractor 57, the lower line on the check will printed when the lobe 69 closes the switch 70. The disk 68 may be adjustably mounted on the shaft 67 to determine the point in the cycle of operations at which the impression device 62 is actuated. However, since this can be controlled by the selective initial positioning of the strip 56 on the tractor 57, the provision for the adjustment is not essential.

To control the operation of the imprinting device 61 (for the top line in the example given), there is a disk 72, similar to the disk 69, having a lobe 73, similar to the lobe 69. However, in order to permit variation in the spacing between the upper and lower lines on the check, as diagrammatically shown in FIG. 6, a switch 74 connected to the impression means 61 by a circuit 75 and mounted on an arm 74a rotatable on the shaft 67 is adjustable arcuately about the axis of the shaft 67. Thus the point in the cycle of operations (the position of the strip 56) at which the impression device 61 operates may be varied by adjusting the position of the switch 74 causing the upper line to be printed sooner or later depending upon whether the space between the lines is to be decreased or increased.

The position of the switch 74 may be adjusted relative to the lobe 73 by manual operation, or its position may be controlled remotely by an electric motor 76 through a circuit 77 leading to the data storage unit or elsewhere.

As stated above, when a number of checks for a particular customer or account as determined by the data on that particular customer's punch card has been imprinted, the feeding of the strip 56 is stopped, the printing operation is interrupted and the setting of the type wheels for the customer's checks next to be printed takes place. This may be accomplished by mechanism shown in block form in FIG. 6 and shown in detail in FIGS. 7 and 8.

As shown in these figures, the control shaft 67 is provided with a worm 78 which drives a worm wheel 79 rotatably mounted on a supporting shaft 80. The worm wheel 79 carries a spring-pressed pawl 81 which engages a ratchet wheel 82 also rotatably mounted on the shaft 80. A switch-operating arm 83 is secured to the ratchet wheel 82 and extends to a position where it engages a stationary switch 84 adapted, when operated, to open a circuit 85 leading to the motor 64 which drives the control shaft 67 and also the strip feeding mechanism. When the shaft 67 rotates, the ratchet wheel 82 and switch arm 83 are moved clockwise as shown in FIG. 7 from the switch-opening position and returning thereto after a 360° revolution.

For the purpose of determining the number of checks to be printed for a particular customer, the switch arm 83 is movable independently of the worm wheel 79 in a clockwise direction, this being permitted by reason of the pawl and rachet connection. The rachet wheel 82 and switch-operating arm 83 may be moved for such purpose by a worm wheel 86 driven by an irreversible worm 87 operated by a stepping motor 88 which is under the control of the data storing unit. To permit the ratchet 82 and switch arm 83 to be advanced by the pawl 81 when the worm wheel 79 is rotated, a friction drive 89 is provided between the worm wheel 86, the switch-operating arm 83 and the ratchet wheel 82.

Assuming that the apparatus is designed to print a maximum of one hundred checks for any customer or account, the ratio between the worm 78 and worm wheel 79 is 100:1. It follows, therefore, that if the switch-operating arm is in a zero position with the switch 84 open and that the motor 64 is energized by other means, for every one hundred revolutions of the shaft 67, the worm wheel 79, ratchet wheel 82 and switch-operating arm 83, the latter will make one revolution, the switch arm returning to its zero position, and one hundred checks will have been imprinted, since one check is printed for each revolution of the shaft 67.

It also follows that if the switch-operating arm 83 is advanced independently of the worm wheel 79 more or less, before the motor 64 is started and the shaft 67 is rotated, a fewer number of checks will be printed depending on how far the switch-operating arm 83 has been advanced clockwise before the shaft 67 begins to rotate. When the switch-operating arm 83 again reaches its zero or circuit-opening position, during the rotation of the shaft 67 the strip-feeding stops and a determinate number of checks will have been printed.

As a practical matter, it is convenient to imprint checks in multiples of ten for each particular customer, i.e. ten for some customers, twenty for others, and so forth, and hence the ratchet wheel 82 is provided with ten teeth and the stepping motor 88 is controlled by the data storing unit to move the worm wheel, switch-operating arm and ratchet wheel in increments of 360° in determining the number of checks to be printed.

To give an example, let it be assumed that the switch-operating arm 83 is in its zero position (to which it always returns when the shaft 67 stops) and that it is desired to imprint twenty checks for the customer, the data of whose card has been stored in the storage unit. The type wheels having been set to print indicia pertinent thereto, the data storage unit will cause the stepping motor to operate eight steps during which time the pawl 81 will click over eight teeth on the ratchet wheel 82 to the position shown in dotted lines in FIG. 7, thereby in effect cancelling out the printing of eighty checks and leaving the switch arm to advance 72° resulting in the printing of twenty checks before the switch 84 is opened.

To start the operations, even though the switch 84 is in open circuit position, a relay switch 90 is energized by the data storage unit to shunt the switch 84 momentarily or at least until the end of the switch-operating arm 83 clears the switch 84 and permits the latter to take control of the circuit to the motor 64.

It should be understood that, in the broader aspects of this invention, other mechanism for counting the number of checks being imprinted and interrupting the imprinting operations than that above described may be employed.

Of course, if it should be desired that the number of checks to be printed for a customer should be in units of five, for instance ten, fifteen, twenty, twenty-five, etc., the ratchet wheel 82 would be provided with twenty teeth and the stepping motor would move the latter and the switch arm 83 in increments of 18°.

One of the features of the present invention, particularly the form being described, is the provision of a method whereby checks and the like of different lengths, i.e. different distances from the top edge to the bottom edge, may be imprinted.

According to the present invention, this is accomplished by selectively varying the relative speed of travel of the preprinted strip and the cycle of operations of the control means 67 so that while the control means makes one revolution for each check or the like, the amount of the strip which is fed during the time required for the control means to make one revolution may be increased or decreased. In other words, if the relative speed between the strip and the control shaft results in advancing the strip 3½", for a check having a length of 3½" and it is desired to imprint on a workpiece having 7", it is merely necessary to double the speed of travel of the strip. If this is done, the only other matter which need be taken into consideration is the adjustment of the switch 74 which controls the operation of the impression means 61 in order to cause the "second" line of imprinting to occur at the proper place on the 7" check, for it will be remembered that the position of the "first" line to be imprinted is controlled by the initial positioning of the strip on the tractor feed 57.

The switch 74 and its carrying arm 74a may be adjusted remotely by operation of the motor 76 and the change speed power transmitting unit 63 may be adjusted in known ways by operation of a lever 63a for instance.

To avoid confusion in describing the method of the present invention referred to in connection with FIG. 6, the worksheet strip has been referred to in the singular. It should be understood, of course, that the strip may be composed of superposed layers of paper with interposed strips of transfer material to make multiple copies; and while checks have been referred to for convenience, it should be understood that deposit slips and other workpieces may be imprinted both in a single strip or multilayer strips.

After a punch card has been read by the car reader 50 and the data stored in the data storage unit 51, the card is removed from the card reader and placed in a convenient receptacle where it may be stored, along with other cards, in order for instance according to the name of the customer. When a customer requires another batch of checks, it is merely necessary for the operator to remove the customer's card from the receptacle and place it on the stack in the card reader so that when it is reached it will be read and data stored and the other operations performed to print the new batch of checks for the customer.

As pointed out above, as shown in FIG. 6, the paper strip 56 is held taut between the pins on the tractor 57 and the pins on the tractor 58 at the introductory and delivery ends of the machine respectively. The tractors being driven continuously during the printing of a sequence of checks, if the speed of travel is moderately high, satisfactory imprints are obtained from both the alphabetical and numerical type wheels because the type faces and hammers 61a and 62a are in contact with the transfer strip and the paper strip for such a short time relative to the speed of the paper strip that blurring of the impressions does not occur. However, if the rate of travel of the strip is too great, blurring of the printed images occurs which is so slight as to be unobjectionable in the case of the ordinary indicia such as the name and address printing. But in the example given, slight blurring of the image printed with magnetic ink occurs. Such slight blurring is objectionable in the case of printing with magnetic ink because the electronic scanning device through which the check is passed will reject the check and not take it into account if the area of a magnetic recognition character is greater than a fixed standard.

An important feature of this invention is a solution of this problem so that higher speeds may be obtained in feeding the paper strip 56 while retaining the advantageous feature of continuously advancing the paper strip as a whole. This is accomplished in one exemplary form of this invention by the step of providing a slightly loosened or slack condition in the portion of the strip between the introductory tractor 57 and the delivery tractor 58 so that a portion of the paper strip between the tractors may be arrested for an instant (which may be in the order of 5 milliseconds) by the engagement of the printing types with the transfer strips and the hammers with the underside of the paper strip.

This feature of the invention is illustrated in FIGS. 9, 10, 11 and 12 which of necessity are diagrammatic. In these figures the height of the check is assumed to be 3½" and, since there are four checks shown, if the strip 56 were taut, the distance between the pin 57a of the introductory tractor 57 and the pin 58a of the delivery tractor 58 would be 14".

However, according to the present invention in the form now being described, the tractors are arranged so that the spacing between pins 57a and 58a is only 13 15/16", thereby producing a slack S in the stretch of the strip between the pins as shown in FIG. 9—the degree of slack being exaggerated for purposes of illustration. When the bottom line of print B of the first check of the group reaches the type wheels 55 and the hammers 62a strike the strip and arrest the strip for an interval of time (in the order of 5 milliseconds), some or all of the slack S to the left of the type wheels 55 as at S' is taken up by the continued operation of the tractor 58, and to the right of the type wheels 55 the slack is increased as at S2 as shown in FIG. 10 by the continued operation of the tractor 57. As soon as the strip is disengaged by the hammers 62a, the slack S reforms as shown in FIG. 11.

When the top line T on the partly printed check reaches the type wheels 54, the strip is again arrested, this time by the wheels 54 and the hammers 61a with the result that the slack S' is taken up and the slack S2 is increased as shown in FIG. 12.

Accordingly, it is to be seen that at the instant the portion of the strip between the tractors is arrested by being engaged between the type wheels and the hammers, i.e., at the instant of printing, the pull on the delivery tractor does not disturb the strip and blurring of the impressions is avoided while the strip as a whole is being continuously advanced by the tractors 54 and 55. By this method, the loss of time which would result in the stopping and starting of the feeding of the strip is avoided.

FIGS. 10 and 12 also illustrate another feature of this invention, that which involves a saving in strip material by printing on each check the bottom line B first and then printing the top line T on the same check before the bottom line B on the next check reaches the type wheels 55. The heavy portions of the line representing the strip 26 indicate printed lines while the dots thereon indicate lines to be printed.

FIG. 10 shows the check "9" as having both lines printed while the check "10," being the last of one group, as having the bottom line B being printed. The travel of the strip 56 continues until the line of print for the top line T on the check "10" reaches the position shown in FIG. 12 in which the type wheels 54 and hammers 61a strike the strip as shown. This occurs before the bottom line of print B of check "1" reaches the type wheels 55.

Check "10" having been completely printed, the feeding and related mechanisms can be stopped and the type wheels 54 and 55 for the next group of checks set to print the indicia relating thereto. After the wheels have been reset, the feeding and related mechanisms may be restarted to print the next group.

Thus it will be seen that a series of groups of checks, each group having different indicia, may be printed continuously without the loss of a partly printed check at the beginning of a group or at the end of a group. If the bottom line B of the first check of one group were printed simultaneously with or before the printing of the top line T of the last check of the preceding group before the type wheels were reset, the first check of the group would be wasted since it would have the indicia relating to the first group on the bottom line and that of the second group on the top line.

Thus it will be seen that the present invention completely obviates the necessity for preliminary and preparatory work such as typesetting, proofreading, platemaking and make-ready which would be required by previous methods of after-printing checks and the like.

By employing settable type-carrying wheels and locking means therefor, the printing characters are automatically positioned in perfect alignment for the precise requirements for printing operations. This is an important consideration in connection with mechanized check handling, otherwise referred to as magnetic ink character recognition, and thus the method and apparatus of this invention is able to fulfill standard requirements set by the American Bankers Asssociation as standard practices which are increasingly coming into universal use in the banks of this country. The requirements so laid down are of such a precise nature that they cannot be met by normal printing methods and equipment. The methods and apparatus disclosed herein meet these strict and precise requirements on a fully automated basis and in a practical and economical manner and at a substantially lower cost.

Variations and modifications may be made within the scope of the claims and portions of the improvements may be used without others.

I claim:

1. A method of printing a plurality of lines of indicia on discrete items which are joined together to form a continuous strip, each line having a predetermined desired location on said items which is spaced longitudinally of the strip from the other lines, the lines being printed at a respective plurality of serially arranged printing positions which are spaced apart longitudinally of the strip a distance in excess of the distance between the desired locations of the lines of indicia, comprising the steps of continuously advancing the continuous strip past the printing positions at a constant rate of speed to bring the desired location of the trailing line of indicia on a given item to the first of the printing positions at a given instant, printing at that instant the trailing line of indicia on that item at that printing position while the strip as a whole is advancing at said constant rate of speed, continuing the advancement of the strip past the printing positions to bring the desired location of the adjacent advanced line of indicia on that item to the next of the printing positions at a subsequent instant, and to dispose the printed trailing line of indicia intermediate said first and said next printing positions, printing at the subsequent instant the adjacent advanced line of indicia on that item at said next printing position while the strip is advancing at said constant rate of speed whereby both printed lines of indicia on that item are spaced longitudinally of the strip a distance less than the distance between said first and said next printing positions, continuing said advancement of the strip and said printing of the lines of indicia as the location of each adjacent advanced line of indicia reaches the next succeeding one of the printing positions until the leading line of indicia is printed at the last one of the printing positions before the location of the trailing line of indicia of the next succeeding item on the strip reaches the first one of the printing positions, continuing said advancement of the strip and said printing of the items in said manner until a plurality of said items has been printed, and interrupting the advancement of the strip after printing a leading line of indicia at said last of the printing positions whereby when the advancement of the strip is interrupted, any given preceding item is completely printed and the next adjacent succeeding item is completely unprinted.

2. A method of printing two lines of indicia on discrete items which are joined together to form a continuous strip, each line having a predetermined desired location on said items which is spaced longitudinally of the strip from the other line, the lines being printed at two serially arranged printing positions which are spaced apart longitudinally of the strip a distance in excess of the distance between the desired locations of the lines of indicia, comprising the steps of continuously advancing the continuous strip past the printing positions at a constant rate of speed to bring the desired location of the trailing line of indicia on a given item to the first of the printing positions at a given instant, printing at that instant the trailing line of indicia on that item at that printing position while the strip as a whole is advancing at said constant rate of speed, continuing the advancement of the strip past the printing positions to bring the desired location of the leading line of indicia on that item to the second of the printing positions at a subsequent instant, and to dispose the printed trailing line of indicia intermediate the printing positions, printing at the subsequent instant the leading line of indicia on that item at said second printing position while the strip is advancing at said constant rate of speed but before the desired location of the trailing line of indicia of the next succeeding item on said strip reaches said first printing position, whereby both printed lines of indicia on that item are spaced apart longitudinally of the strp a distance less than the distance between the printing positions, continuing said advancement of the strip and said printing of the items in said manner until a plurality of the items has been printed, and interrupting the advancement of the strip after printing a leading line of indicia at said second printing position whereby when the advancement of the strip is interrupted, both lines of indicia are printed on a preceding item while the next succeeding item remains unprinted.

3. The method as set forth in claim 2 further including the step of initially selectively advancing or retarding the instant of printing at another succeeding printing position relative to the instant of printing at the first printing position, without altering the rate of speed of the advancing strip, so that less or more respectively of an item being printed passes said another printing position before printing occurs thereat, whereby the predetermined location of at least one of the advanced lines of indicia may be varied to change the format of any selected number of items being printed.

4. The method as set forth in claim 2 further including the step of initially selectively increasing or decreasing the rate of speed of the strip advancement without altering the instants of printing at the printing positions so that more or less respectively of an item being printed passes from said first printing position to another printing position between the respective instants of printing whereby the lines of indicia will have the same relative locations on items of various length measured longitudinally of the strip.

5. The method as set forth in claim 2 further including the step of initially selectively advancing or retarding the instant of printing at another printing position relative to the instant of printing at the first printing position, so that less or more respectively of an item being printed passes said another printing position before printing occurs thereat, and simultaneously selectively increasing or decreasing the rate of speed of the strip advancement so that more or less respectively of an item being printed passes from said first printing position to said another printing position between the respective instants of printing, whereby both the predetermined location of an advanced line of indicia may be varied to change the format of any selected number of items of a given size being printed, and also the length of the items measured longitudinally of the strip may be varied while maintaining the same relative locations of the lines of indicia on the several items being printed.

6. A method of printing on a continuous strip advancing along a path of travel past a printing position having introductory and delivery sides respectively, comprising the steps of engaging and gripping the strip at both the introductory and delivery sides of the printing position at loactions of engagement spaced from both sides of the printing position for advancing the strip past the printing position, continuously advancing the strip past the printing position, while so advancing the strip, maintaining between said locations of engagement a linear length of said strip slightly in excess of the linear distance between said locations of engagement when measured along a path of travel determined by the strip being advanced in a substantially taut condition to provide an unsupported slack stretch of the strip between the locations of engagement, intermittently momentarily engaging a portion of the slack stretch of the strip for printing thereon thereby momentarily holding said portion against advancement while the printing is taking place, and simultaneously pushing additional strip to the introductory side of the printing position and pulling the printed strip from the delivery side of the printing position whereby the strip as a whole continues to advance for the instant that the said portion of the slack stretch of the strip is held against advancement during said engagement for printing, the portion of the slack stretch between the printing position and the location of engagement at the delivery side thereof continuing to advance while the slack therein is taken up and the portion of the slack stretch between the printing position and the location of engagement at the introductory side thereof continuing to advance while the slack therein increases, until the engagement at the printing position is released.

References Cited by the Examiner
UNITED STATES PATENTS

| | | | |
|---|---|---|---|
| 400,269 | 3/89 | Thompson | 101—219 |
| 1,226,243 | 5/17 | O'Connor | 101—219 |
| 1,411,789 | 4/22 | Kellogg | 101—288 |
| 1,825,821 | 10/31 | Rosenthal | 101—198 |
| 2,220,903 | 11/40 | Higgins et al. | 101—92 |
| 2,252,734 | 8/41 | Sherman | 101—19 |
| 2,321,057 | 6/43 | Weiss | 101—426 |
| 2,334,074 | 11/43 | Coy | 101—181 |
| 2,531,873 | 11/50 | Daly | 101—19 |
| 2,655,098 | 10/53 | Dutro et al. | 101—19 |
| 2,710,406 | 6/55 | Gollwitzer | 101—19 |
| 2,770,185 | 11/56 | Crowell et al. | 101—19 |
| 2,770,188 | 11/56 | Nolan | 101—93 |
| 2,790,528 | 4/57 | Teitler | 101—93 |
| 2,889,758 | 6/59 | Bolton | 101—426 |
| 2,912,926 | 11/59 | Haskin | 101—227 X |
| 2,941,188 | 6/60 | Flechtner et al. | |
| 3,025,791 | 3/62 | Auerbacher | 101—181 |

OTHER REFERENCES

Bank Management Committee, The Common Machine Language, N.Y., The Amer. Bankers Assoc., Revised 1962, pp. 4, 11–13 relied on.

DAVID KLEIN, WILLIAM B. PENN, *Examiners.*
ROBERT E. PULFREY, *Primary Examiner.*

UNITED STATES PATENT OFFICE
CERTIFICATE OF CORRECTION

Patent No. 3,194,157                          July 13, 19

Earnest R. McKeag

It is hereby certified that error appears in the above numbered patent requiring correction and that the said Letters Patent should read as corrected below.

Column 2, line 49, for "Theerafter" read -- Thereafter --; column 4, line 45, for "trips" read -- strips --; column 6, li 68, for "Machies" read -- Machines --; column 7, line 32, for "relatively" read -- relative --; line 64, after "required" insert -- number --; column 8, line 13, after "will" insert -- be --; column 13, line 8, for "strp" read -- strip --; column 14, line 2, for "loactions" read -- locations --; column 14, after line 50, insert the following:
         2,951,438    9/60     Weingart    101/68

(SEAL) Signed and sealed this 18th day of January 1966.

Attest:

ERNEST W. SWIDER
Attesting Officer

EDWARD J. BRENNER
Commissioner of Patents